United States Patent

Millner

(10) Patent No.: US 8,882,893 B2
(45) Date of Patent: Nov. 11, 2014

(54) METHOD FOR CLEANING A GAS FLOW LOADED WITH DUST

(75) Inventor: Robert Millner, Loosdorf (AT)

(73) Assignee: Siemens Vai Metals Technologies GmbH (AT)

( * ) Notice: Subject to any disclaimer, the term of this patent is extended or adjusted under 35 U.S.C. 154(b) by 116 days.

(21) Appl. No.: 13/811,433

(22) PCT Filed: Jul. 7, 2011

(86) PCT No.: PCT/EP2011/061507
§ 371 (c)(1),
(2), (4) Date: Jan. 22, 2013

(87) PCT Pub. No.: WO2012/010430
PCT Pub. Date: Jan. 26, 2012

(65) Prior Publication Data
US 2013/0112075 A1    May 9, 2013

(30) Foreign Application Priority Data

Jul. 20, 2010   (AT) ............................... A 1224/2010

(51) Int. Cl.
*B01D 46/02* (2006.01)
*B01D 46/24* (2006.01)
*B01D 46/00* (2006.01)

(52) U.S. Cl.
CPC ...... *B01D 46/0068* (2013.01); *B01D 2258/025* (2013.01); *C21B 2100/02* (2013.01); *C21B 2100/04* (2013.01); *B01D 2257/504* (2013.01); *B01D 46/02* (2013.01); *B01D 46/24* (2013.01)
USPC ........................................................ 95/279

(58) Field of Classification Search
CPC .... B01D 46/0068; B01D 46/02; B01D 46/24; B01D 53/02; B01D 53/04; B01D 2256/20; B01D 2257/504; B01D 2257/80; B01D 2258/025; C21B 2100/02; C21B 2100/04
USPC ........ 96/134; 95/96, 117, 139, 236, 214, 273, 95/278–280; 55/302, 303; 423/220; 75/392; 266/144, 156, 157, 159
See application file for complete search history.

(56) References Cited

U.S. PATENT DOCUMENTS

| 4,220,457 A | 9/1980 | Fredriksen | 55/273 |
| 4,692,173 A | 9/1987 | Roos | 95/279 |
| 5,269,835 A | 12/1993 | Jensen | 95/279 |
| 6,562,103 B2* | 5/2003 | Sethna et al. | 75/505 |
| 8,709,128 B2* | 4/2014 | Knop et al. | 75/392 |

(Continued)

FOREIGN PATENT DOCUMENTS

| CN | 101638702 A | 2/2010 |
| DE | 3114068 A1 | 11/1982 |

(Continued)

OTHER PUBLICATIONS

International Search Report, PCT/EP2011/061507, 15 pages, Oct. 27, 2011.

*Primary Examiner* — Frank Lawrence
(74) *Attorney, Agent, or Firm* — Ostrolenk Faber LLP

(57) ABSTRACT

A method is provided for cleaning a gas flow made of top gas and/or off gas and/or export gas from a direct reduction plant or a melt reduction plant, which is loaded with dust and/or fine particulate solids. The gas flow is subjected to a dry cleaning using at least one dry filter, wherein dusts and/or fine particulate raw materials are separated from the gas flow. The cleaned gas flow is fed into a CO2 separating device, wherein CO2 is separated, forming a product gas that is substantially free of water and CO2 and is used for backflushing the dry filter.

9 Claims, 1 Drawing Sheet

(56) References Cited

U.S. PATENT DOCUMENTS

| | | | |
|---|---|---|---|
| 2003/0217533 A1 | 11/2003 | Muller | 55/302 |
| 2011/0229276 A1 | 9/2011 | Eder et al. | 406/10 |
| 2013/0112075 A1 | 5/2013 | Millner | 95/96 |

FOREIGN PATENT DOCUMENTS

| | | | | |
|---|---|---|---|---|
| DE | 3124485 A1 | 1/1983 | | A61K 31/40 |
| DE | 3505729 A1 | 8/1986 | | B01D 46/00 |
| DE | 3925818 A1 | 2/1991 | | |
| DE | 10126048 A1 | 12/2002 | | B01D 46/00 |
| EP | 0299898 A2 | 1/1989 | | |
| GB | 761999 A | 11/1956 | | B01D 46/04 |
| GB | 1214872 A | 12/1970 | | B01D 45/12 |
| JP | 05-076803 A | 3/1993 | | B04C 5/107 |
| WO | 94/11283 A1 | 5/1994 | | B01D 46/02 |
| WO | 2010/046210 A1 | 4/2010 | | B01D 46/00 |
| WO | 2012/010430 A1 | 1/2012 | | B01D 46/00 |

\* cited by examiner

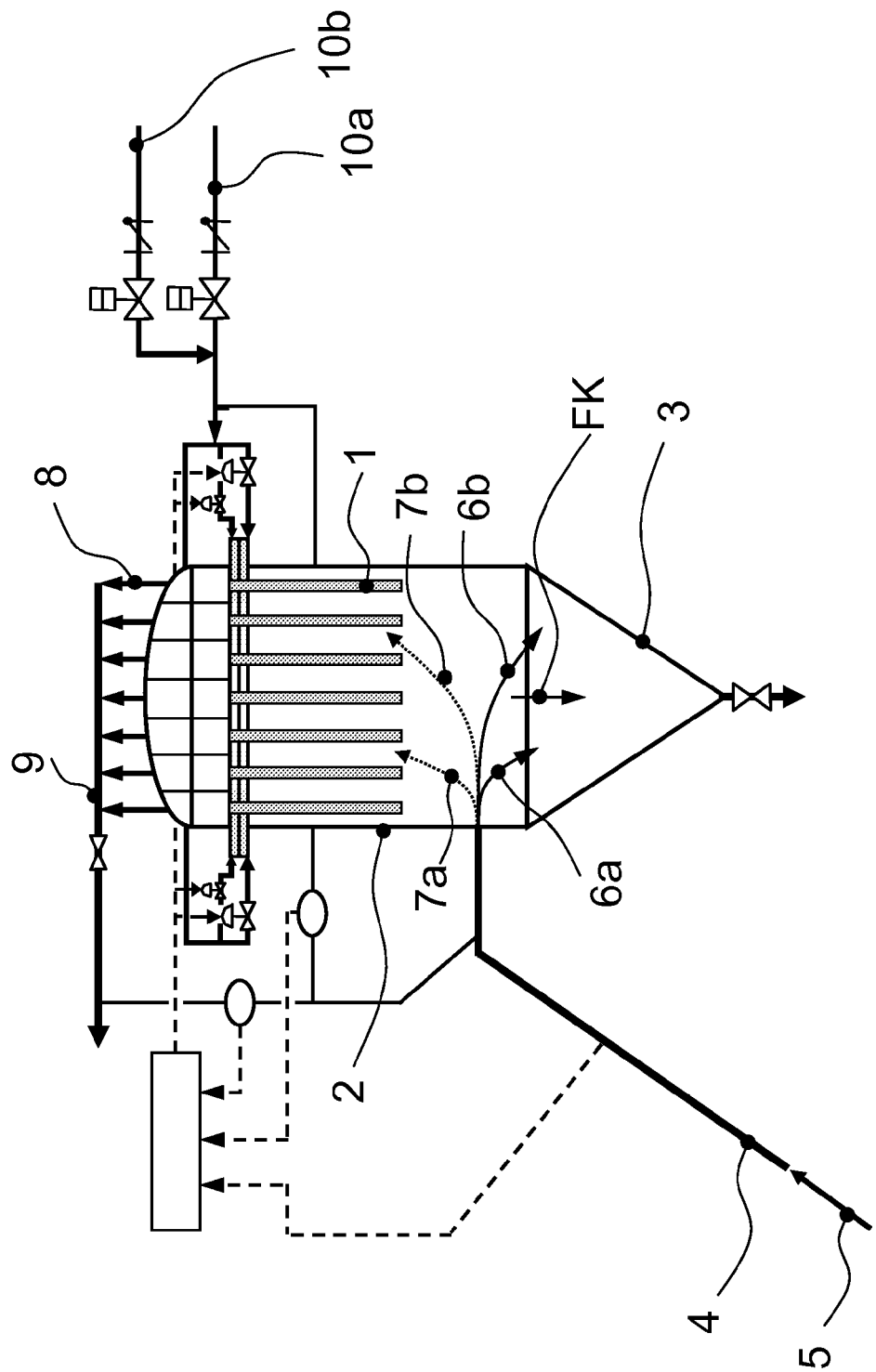

METHOD FOR CLEANING A GAS FLOW LOADED WITH DUST

CROSS-REFERENCE TO RELATED APPLICATIONS

This application is a U.S. National Stage Application of International Application No. PCT/EP2011/061507 filed Jul. 7, 2011, which designates the United States of America, and claims priority to AT Patent Application No. A1224/2010 filed Jul. 20, 2010. The contents of which are hereby incorporated by reference in their entirety.

TECHNICAL FIELD

The disclosure relates to a method for cleaning a gas flow made up of top gas and/or off gas and/or export gas from a direct reduction plant or melt reduction plant, which is loaded with dust and/or with fine particulate solids, for the reduction, and where applicable for the smelting, of lumpy or particulate, in particular fine particulate, solids, wherein the gas flow is initially subjected to a dry cleaning by means of at least one dry filter, wherein dusts and/or fine particulate raw materials are separated from the gas flow, and this cleaned gas flow is fed at least in part to a $CO_2$ separating device for the purpose of $CO_2$ separation, wherein $CO_2$ and where applicable water are separated, forming a product gas which is substantially free of $CO_2$ and a tail gas which is rich in $CO_2$.

BACKGROUND

A melt reduction plant is operated in a two-stage process, wherein in a first step solid metal-containing raw materials are reduced by means of reduction gas and this pre-reduced material is smelted in a second step to produce liquid metal whilst simultaneously adding energy sources, in particular coal, coke, etc. Melt reduction plants in the context of this application are understood to include a blast furnace (operated using hot blast and/or oxygen), a plant using the COREX® or FINEX® process and further available melt reduction processes.

It is known that dry filters are utilized for cleaning, in particular hot, process gases, such as for example blast furnace gas from blast furnaces or top gas from reduction plants. It is advantageous in this situation that in contrast to wet scrubbing no sludges or wastewaters accumulate which in turn would need to be subjected to complex further treatment. It is furthermore known to clean the dry filters by backflushing with flushing gases, wherein the filter cake is released from the filter. Primarily compressed air but also nitrogen are used for this purpose in conventional techniques. The disadvantage in this situation is that additional process gases are required in considerable quantities.

It is known from JP 05-076803 A to arrange a filter in a cyclone separator, wherein following a coarse separation in the cyclone separator a fine separation takes place in the filter. The material separated in this case can be further processed.

WO 94/11283 likewise describes the separation of dusts from a conveying gas and the delivery of the dusts separated thereby to an open receptacle and the cleaning of the conveying gas in the cyclone separator and a bag filter.

SUMMARY

One embodiment provides a method for cleaning a gas flow made up of top gas and/or off gas and/or export gas from a direct reduction plant or melt reduction plant, which is loaded with dust and/or with fine particulate solids, for the reduction, and where applicable for the smelting, of lumpy or particulate, in particular fine particulate, solids, wherein the gas flow is initially subjected to a dry cleaning by means of at least one dry filter, wherein dusts and/or fine particulate raw materials are separated from the gas flow, and this cleaned gas flow is fed at least in part to a $CO_2$ separating device for the purpose of $CO_2$ separation, wherein $CO_2$ and where applicable water are separated, forming a product gas which is substantially free of $CO_2$ and a tail gas which is rich in $CO_2$, wherein at least one part of the product gas is introduced into the dry filter under pressure, in particular from 1.5 to 12 $bar_g$, for example, 2 to 6 $bar_g$, for backflushing the at least one dry filter and for removing the filter cake.

In a further embodiment, the product gas used for backflushing is in turn fed through the dry filter after the backflushing and is thereby cleaned.

In a further embodiment, at least one part of the clean product gas is fed again as reduction gas to the direct reduction plant or the melt reduction plant and/or a further reduction plant operating in conjunction with at least one of these plants or a coal gasifier plant.

In a further embodiment, at least one part of the product gas, after it has been used in the dry filter, is fed again as reduction gas to the direct reduction plant or the melt reduction plant and/or a further reduction plant operating in conjunction with at least one of these plants or a coal gasifier plant.

In a further embodiment, nitrogen is used as an alternative to product gas for backflushing the dry filter during the startup and/or shutdown operating states.

In a further embodiment, the particulate raw materials are oxidic solids containing iron, in particular iron ores, and where applicable additives.

In a further embodiment, for further use the filter cake is fed to a compacting facility, in particular an agglomerating unit, or a metallurgical unit, in particular a melting unit, for processing the particulate solids.

BRIEF DESCRIPTION OF THE DRAWING

FIG. 1 illustrates an example of a dry filter having a backflushing facility for top gas or off gas, according to an example embodiment.

DETAILED DESCRIPTION

Embodiments of the present disclosure provide a method which enables a dry filter to be cleaned reliably and more cost-effectively.

In some embodiments, the method uses a product gas, which is almost free of $CO_2$, in order to backflush the at least one dry filter. Product gas is produced by adsorption systems, such as for example (vacuum) pressure swing adsorption (PSA) or vacuum pressure swing adsorption (VPSA), wherein $CO_2$ and moisture are separated from a gas. This results in a gas with a higher concentration of CO and $H_2$ which has no moisture (dew point<−100° C.). This dry and clean product gas is ideally suited for backflushing the dry filters or for removing the filter cake, where on account of the composition of the product gas this can be put to further uses as a high-grade gas for example together with export gas. A pressure range of in particular 1.5 to 12 $bar_g$, for example 2 to 6 $bar_g$, has proved to be advantageous for backflushing. When using nitrogen for example as the gas for backflushing the dry filter there is an undesired increased concentration of nitrogen in the process gas or in the export gas. Furthermore, according to conventional techniques, relatively large quantities of flushing gas such as for example nitrogen need to be used. In addition to the aforementioned gases, the top gases from direct reduction plants based on reformed natural gas or from MIDREX® plants which operate in conjunction with coal gas plants or products thereof can also be processed by oxygen blast furnaces.

According to a particular embodiment of the method, the product gas used for backflushing is in turn fed through the dry filter after the backflushing and is thereby cleaned. On account of its composition which is comparable to the reduction gas, the product gas can be used again and can for example be mixed with process gases from the direct reduction plant.

The pressure on the clean gas side in the filter element (for example of a baghouse filter, ceramic filter cartridge, etc.) is briefly increased by the product gas, which results in the filter cake being cleaned off the outside of the filter element. After the backflushing the product gas mixes with the process gas and therefore is either used again in the process by way of vapor recovery and/or is used with the export gas (for example thermal use in a power plant, etc.). The product gas can exhibit approximately the following composition:

| Gas component | Typical proportions: | Typical range: |
|---|---|---|
| CO | 52 vol % | 45-60 vol % |
| $CO_2$ | 3 vol % | 2-3 vol % |
| $H_2$ | 25 vol % | 20-35 vol % |
| $H_2O$ | 0 vol % | 0 vol % |
| $CH_4$ | 2 vol % | 1-2 vol % |
| $N_2$ | 18 vol % | 5-25 vol % |

One embodiment of the method provides that at least one part of the cleaned product gas is fed again as reduction gas to the direct reduction plant or the melt reduction plant and/or a further reduction plant operating in conjunction with at least one of these plants or a coal gasifier plant. The cleaned and dry product gas which has been used for flushing the dry filter is suitable for use in the direct reduction plant, in the melt reduction plant or also for use in further reduction plants which are operated in conjunction with the direct reduction plant or melt reduction plant. The operation of a direct reduction plant jointly with a blast furnace is an advantageous embodiment. For example, the cleaned product gas can also be fed to the export gas from the direct reduction plant.

An alternative embodiment of the method provides that at least one part of the product gas, after it has been used in the dry filter, is fed again as reduction gas to the direct reduction plant or the melt reduction plant and/or a further reduction plant operating in conjunction with at least one of these plants or a coal gasifier plant. As a result of using the product gas it is possible to increase the process efficiency, which can also be achieved by a combination of a direct reduction plant with a further reduction plant.

According to one embodiment of the method, nitrogen is used as an alternative to product gas for backflushing the dry filter during the startup and/or shutdown operating states.

One embodiment of the method provides that the melt reduction plant is operated in accordance with a method of the COREX® or FINEX® type or is a blast furnace. COREX® and FINEX® are known melt reduction methods for reducing particulate or fine particulate raw materials. Top gas from the COREX® method or off gas from the FINEX® method or blast furnace gas from a blast furnace can thus be put to use according to the disclosed method, where the product gas can in turn be used further without this resulting in a negative influence on the process gases or the export gas in this situation. Said product gas can therefore for example together with export gas be put to further uses. For example, a thermal use of the export gas for power generation in an associated power plant, for example in a gas and steam power plant, is conceivable.

According to one embodiment of the method, the particulate raw materials are oxidic solids containing iron, in particular iron ores, and where applicable additives.

According to a further embodiment of the method, for further use the filter cake is fed to a compacting facility, in particular an agglomerating unit, or a metallurgical unit, in particular a melting unit, for processing the particulate solids. In addition to the product gas for backflushing the dry filter, the filter cake is thus also sent for re-use. Furthermore, further re-use options are possible for the filter cake.

On account of the large quantities of dusts and fine particulate solids which result in process gases from the reduction metallurgy, cleaning facilities must be designed for process gases in such a manner that these large quantities can be reliably processed. In order to guarantee reliable functioning of the dry filter, the dry filter has backflush facilities for separating the filter cake from the dry filter. For the most part, the dry filter is connected in such a manner with a container which has a conical lower part such that the filter cake reaches the lower part of the container during backflushing. As a result of the backflushing of the filter facility, the filter is cleaned and restored to its initial operating state. The solids deposited on the filter as filter cake are removed from the dry filter and introduced into the container. From the container, the filter cake can for example be fed to an agglomerating unit or some other further processing facility.

During operation of normal COREX® plants approximately 380,000 $Nm^3$/hr of top gas are produced at a temperature of approximately 300° C., which need to be cleaned before the top gas is used. This is done by means of a dry filtering process. Approximately 300 $Nm^3$/hr of flushing gas, in other words specifically product gas, are required in order to ensure reliable operation of the dry filters. Accordingly, it is possible to save this quantity of nitrogen which is used as flushing gas. During operation of FINEX® plants the export gas is produced at a temperature of approximately 450° C., with approximately 330,000 $Nm^3$/hr needing to be cleaned by the dry filter. Normal flushing gas quantities in this situation are approximately 500 $Nm^3$/hr. The flushing gas is introduced at a pressure of 4 to 8 $bar_g$, in particular at approximately 5.5 $bar_g$. Typical flushing times per filter element group are fractions of seconds, with the individual filter element groups or even individual filters being cleaned cyclically in succession (for example on account of a limit value for the pressure differential or after a period of time has elapsed).

Sintered porous metal filters, ceramic filters or also bag or baghouse filters can be used as dry filters. Such types of filter are characterized by high operating temperatures. In the case of bag or baghouse filters it may be necessary to subject the gas to a cooling process beforehand.

FIG. 1 shows a possible embodiment of a dry filter having filter elements 1 which are arranged in a housing 2. Beneath the housing 2 is arranged a conical container 3. The conical container 3 can for example be connected to an agglomerating unit (not illustrated) and/or a melting unit (likewise not illustrated) such that the filter cake can be discharged from the conical container 3. A gas flow 5 made up of top gas and/or export gas from a direct reduction plant and loaded with dusts and/or with fine particulate solids is introduced into the housing 2 by way of a transport line 4.

The incoming gas flow 5 and the particulate solids are partially separated in the housing 2, with one part of the fine particulate solids 6a and 6b falling into the container 3 due to gravity. Dusts and the remaining fine particulate solids are conveyed with the gas flow 7a, 7b into the dry filter and are separated at the filter elements 1. The cleaned gas flow is discharged from the dry filter by way of pipes 8 of one or more discharge lines 9 and fed to a $CO_2$ separating device (not shown), with a largely $CO_2$—free and dry product gas and a $CO_2$—rich tail gas being formed. Alternatively, it is also possible to remove a part of the cleaned gas flow upstream of the $CO_2$ separating device.

The dry filter has backflushing facilities 10a with which, depending on requirements, one part of the product gas can be introduced in the opposite direction of flow to the gas flow into the dry filter as flushing gas under an overpressure of approximately 6.5 bar, wherein the separated dusts and fine particulate solids which form the filter cake FK can in turn be removed from the filter elements 1 and delivered into the container 3. Alternatively, it is also possible to introduce nitrogen by way of a backflushing facility 10b.

The backflushing facility can be designed as a ring line having a plurality of discharges and corresponding stop valves. Normally, the feed of the gas flow 5 loaded with dust and/or with fine particulate solids into the dry filter during flushing with product gas is interrupted by valves.

When ceramic filter elements are used, the dry filter can process the hot top gas directly. When bag or baghouse filters are used, it is necessary to cool the top gas prior to filtering. The waste heat from the hot top gas can in any case be used before or after the dry filtering in order to produce steam and the cleaned top gas can be expanded in a turbine and delivered for further instances of external usage.

LIST OF REFERENCE CHARACTERS

1 Filter elements
2 Housing
3 Conical container
4 Transport line
5 Gas flow
6a, 6b Fine particulate solids
7a, 7b Dusts and remaining fine particulate solids
8 Pipes
9 Discharge lines
10a, 10b Backflushing facilities
11 Pipes

What is claimed is:

1. A method for cleaning a gas flow comprising at least one of top gas, off gas, and export gas from a direct reduction plant or melt reduction plant, which is loaded with dust and/or with fine particulate solids, the method comprising:
    subjecting the gas flow to a dry cleaning using at least one dry filter, wherein dusts and/or fine particulate raw materials are separated from the gas flow,
    feeding at least a part of the cleaned gas flow to a $CO_2$ separating device for $CO_2$ separation, wherein CO2 and optionally water are separated, thereby forming a product gas that is substantially free of $CO_2$ and a tail gas that is rich in $CO_2$, and
    introducing at least part of the product gas into the at least one dry filter under a pressure between 1.5 $bar_g$ and 12 $bar_g$, thereby backflushing the at least one dry filter and removing the filter cake.

2. The method of claim 1, wherein the product gas used for backflushing is in turn fed through the dry filter after the backflushing and is thereby cleaned.

3. The method of claim 2, comprising feeding at least a part of the clean product gas as a reduction gas to at least one of the direct reduction plant, the melt reduction plant, and a further reduction plant operating in conjunction with the direct reduction plant, the melt reduction plant, or a coal gasifier plant.

4. The method of claim 1, wherein at least one part of the product gas, after it has been used in the dry filter, is fed again as a reduction gas to at least one of the direct reduction plant, melt reduction plant, and a further reduction plant operating in conjunction with the direct reduction plant , the melt reduction plant, or a coal gasifier plant.

5. The method of claim 1, wherein nitrogen is used as an alternative to the product gas for backflushing the dry filter during at least one of a startup operating state and a shutdown operating state.

6. The method of claim 1, wherein the particulate raw materials comprise oxidic solids containing iron.

7. The method of claim 1, comprising feeding the filter cake to a compacting facility or a metallurgical unit for processing the particulate solids.

8. The method of claim 1, comprising introducing the at least part of the product gas into the at least one dry filter under a pressure between 2$bar_g$ and 6 $bar_g$, thereby backflushing the at least one dry filter and removing the filter cake.

9. The method of claim 6, wherein the particulate raw materials comprise oxidic solids containing iron ores.

* * * * *